US011735986B2

(12) United States Patent
Almeida E Silva et al.

(10) Patent No.: US 11,735,986 B2
(45) Date of Patent: *Aug. 22, 2023

(54) ELECTRICAL MACHINE FOR A VEHICLE

(71) Applicant: Mahle International GmbH, Stuttgart (DE)

(72) Inventors: Roberto Almeida E Silva, Stuttgart (DE); Bernd Blankenbach, Boeblingen (DE); Terry Cox, Swinford (GB); Philip Grabherr, Stuttgart (DE); Niklas Kull, Stuttgart (DE); Tim Male, Telford (GB); Peter Pisek, Leitring (AT); Peter Sever, Murska Sobota (SI); Josef Sonntag, Nuertingen (DE); Martin Williams, Northkampton (GB)

(73) Assignee: Mahle International GmbH, Stuttgart (DE)

( * ) Notice: Subject to any disclaimer, the term of this patent is extended or adjusted under 35 U.S.C. 154(b) by 685 days.

This patent is subject to a terminal disclaimer.

(21) Appl. No.: 16/689,047

(22) Filed: Nov. 19, 2019

(65) Prior Publication Data

US 2020/0161947 A1 May 21, 2020

(30) Foreign Application Priority Data

Nov. 19, 2018 (DE) ...................... 10 2018 219 818.7

(51) Int. Cl.
*H02K 15/10* (2006.01)
*H02K 3/28* (2006.01)
(Continued)

(52) U.S. Cl.
CPC .......... *H02K 15/105* (2013.01); *B29C 45/14* (2013.01); *H02K 1/16* (2013.01); *H02K 3/28* (2013.01);
(Continued)

(58) Field of Classification Search
CPC .................................. H02K 3/24; H02K 3/30
See application file for complete search history.

(56) References Cited

U.S. PATENT DOCUMENTS 3,624,432 A * 11/1971 Merz ........................ H02K 3/48
310/66
2020/0156296 A1 * 5/2020 E Silva ..................... H02K 3/28

FOREIGN PATENT DOCUMENTS

JP                 10271738 A     * 10/1998

OTHER PUBLICATIONS

Machine translation of JP-10271738-A, retrived from ESPACENET.*

* cited by examiner

*Primary Examiner* — Ahmed Elnakib
*Assistant Examiner* — Minki Chang
(74) *Attorney, Agent, or Firm* — Ewers IP law PLLC; Falk Ewers (57) ABSTRACT

A method for producing a stator for an electrical machine includes providing the stator including a ring-shaped stator body, from which a plurality of stator teeth arranged spaced apart along a circumferential direction of the stator body protrude radially to the inside. A space is thereby provided between two stator teeth adjacent to one another in the circumferential direction. Second, a first injection molding of two stator teeth adjacent to one another in the circumferential direction with a plastic is performed. Third, a stator winding is arranged in the space. Fourth, a second injection molding of the stator winding arranged in the space with the plastic is performed such that an air gap and/or an air trap between the stator teeth injection molded in the second step and the stator winding after the arrangement of the stator winding in the space in the third step, is filled with the plastic.

20 Claims, 10 Drawing Sheets (51) Int. Cl.
*B29C 45/14* (2006.01)
*H02K 1/16* (2006.01)
*H02K 9/197* (2006.01)
*B29C 45/17* (2006.01)
*B29C 45/00* (2006.01)

(52) U.S. Cl.
CPC ...... *H02K 9/197* (2013.01); *B29C 2045/0079* (2013.01); *B29C 2045/1786* (2013.01)

FIG. 11

ELECTRICAL MACHINE FOR A VEHICLE

CROSS REFERENCE TO RELATED APPLICATIONS

This application claims priority to German patent application DE 10 2018 219 818.7, filed Nov. 19, 2018, the entire content of which is incorporated herein by reference.

TECHNICAL FIELD

The disclosure relates to a method for producing a stator for an electrical machine. The disclosure further relates to a stator, which is produced by this method, as well as to an electrical machine including such a stator.

BACKGROUND

Conventional stators for electrical machines typically include stator windings, which are electrically energized during operation of the machine. Such electrical machines can generally be an electric motor or a generator. The electrical machine can be embodied as external rotor or as internal rotor. Heat, which has to be dissipated in order to avoid an overheating and damages to or even destruction of the stator associated therewith, is created during operation of the machine. For this purpose, it is known from conventional stators to equip them with a cooling system for cooling the stator—in particular said stator windings. Such a cooling system includes one or a plurality of cooling ducts, through which a coolant flows and which are arranged in the stator in the vicinity of the stator windings. Heat can be dissipated from the stator by heat transfer from the stator windings to the coolant. An overheating of the stator windings and, associated therewith, damages to or even destruction of the stator can be prevented in this way.

To keep the production costs for the provision of the above-mentioned cooling ducts low, it is known to injection mold the lamination stacks of the stator forming the stator body including the stator teeth supporting the stator windings with a plastic compound and to create said cooling ducts in the plastic compound in the course of the injection molding process. Stator windings wound onto the stator teeth can be permanently fixed on the stator in the course of the injection molding.

It turns out to be problematic in this context that, when injection molding the stator body and the windings arranged on the stator teeth, it cannot be guaranteed that the windings, which are embodied to be electrically conductive, do not bear against the—also electrically conductive—stator body, which is typically formed by electrically conductive shaped sheet metal parts, which are stacked on top of one another. The associated electrical connection between stator windings and stator body, however, effects an unwanted electrical short-circuit.

This also applies for the case, which is common in practice that the stator windings are already manufactured with a winding insulation, because the latter can be partially damaged or even destroyed during operation of the electrical machine due to high temperatures, which may be caused by the electrical current flowing through the stator windings.

It can likewise not be ruled out that the stator windings do not protrude into the cooling ducts after the creation of the cooling ducts by the injection molding process with plastic compound. In the event that the above-mentioned electrical insulation of the stator windings is damaged or even destroyed, the stator windings cannot only come into direct contact with the electrically conductive material of the stator teeth, but also with the coolant, which has to be avoided.

SUMMARY

It is thus an object of the present disclosure to create an improved production method for producing a stator including cooling ducts, in the case of which the above-mentioned disadvantages are largely or even completely eliminated.

This object is achieved by a method for producing a stator for an electrical machine, by a stator, and by an electrical machine as described herein.

It is an idea of the disclosure to injection mold the electrically conductive stator teeth as limiting components of a stator groove as well as the stator windings arranged in the stator groove with a plastic twice. By such a two-fold injection molding with the plastic, it can be virtually ruled out that an electrical connection can be established between the stator teeth, which, as part of the stator typically consist of an electrically conductive material, such as a metal, for instance, and the stator windings, which are also electrically conductive. This applies in particular for the praxis-relevant case that the winding insulation of the stator windings is damaged in response to the production of the stator, so that the electrically conductive conductor elements of the stator windings are exposed.

A method according to an aspect of the disclosure includes the following four method steps a) to d): in a first step a), a stator is provided, which includes a ring-shaped stator body, from which a plurality of stator teeth, which are arranged spaced apart from one another along a circumferential direction of the stator body, for accommodating stator windings protrude, typically radially to the inside. A space—the stator groove—which is limited in the circumferential direction by said two stator teeth and radially on the outside by the stator body, is thereby in each case embodied between two stator teeth, which are adjacent in the circumferential direction. Radially on the inside, the space is embodied to be open. Such a space is also known to the person of skill in the art under the name "stator groove". In a second step b), a (first) injection molding of at least two stator teeth, which are adjacent in the circumferential direction, with the plastic, which later serves for the heat transfer, takes place. In a third method step c), at least one stator winding is arranged in the space between the two stator teeth. In a fourth method step d), a (second) injection molding of the stator winding arranged in the space with the plastic takes place, so that an air gap and/or air trap formed between the stator teeth injection molded in step b) and the stator winding after arrangement of the stator winding in the space according to step c), is filled with the plastic. If present, typically a plurality of such air gaps and/or air traps are filled, particularly typically all of the air gaps and/or air traps, which are present in the space. In the ideal case, no air gaps or air traps whatsoever, respectively, thus remain in the space after the second injection molding.

Due to the fact that in the case of the method according to an aspect of the disclosure the surface sections of the stator teeth, which limit the space and which are typically embodied to be electrically conductive, as well as the stator winding are injection molded with plastic, so that no air gaps or air traps, respectively, remain in the space after such a two-fold injection molding, it can be ensured that no electrical contact can occur between the stator winding and the stator teeth even in the case of damaged winding insulation of the stator winding.

Due to the fact that plastic has a higher heat conductivity than air, an improved heat dissipation from the stator winding also becomes possible by the filling of the air gaps/air traps, which are present in the space, with plastic.

In the case of a stator produced by the method introduced here, the cooling of the stator windings arranged in the respective space can thus take place highly effectively by transport of waste heat generated in the stator windings, in particular in the axial end sections thereof, by the plastic injected into the space to a cooling duct, which is present in the space. The waste heat can be absorbed therein by the coolant, which is guided through the cooling duct.

The above-described process is typically applied to a plurality of the stator teeth and to a plurality of the stator windings. Particularly, the above-described process is applied to all of the stator teeth, which are present in the stator body, and to all of the stator windings, which are arranged on the stator teeth.

In an exemplary embodiment, an electrically insulating plastic is used at least in response to the first injection molding, typically additionally also in response to the second injection molding. The plastic cannot only be used for the heat transfer, but also as electrical insulator in this way. An unwanted electrical short-circuit between the stator winding and a cooling duct, which is embodied in the space and which is limited by the plastic, or the coolant, which flows through the cooling duct, respectively, can be avoided in this way. An unwanted electrical short-circuit between the stator winding and the stator teeth or the stator body, respectively, which typically consist of an electrically conductive material, is likewise avoided.

According to a further aspect of the disclosure, at least one masking, which is introduced into the space between the two stator teeth, is at least partially injection molded with the plastic, so that the volume of the space, which is filled by the at least one masking in response to this injection molding, remains free so as to embody a cooling duct. Due to the fact that the cooling duct is thus limited directly by the heat conducting plastic, an optimal thermal connection of the plastic with the coolant, which is guided through the cooling duct, can be attained in this way.

The injection molding of the masking can advantageously take place in the course of the second injection molding. This option is advisable, when no material change with respect to the used plastic material is to take place for the creation of the limitation of the cooling duct with respect to the second injection molding. Otherwise, it is advisable to carry out the injection molding of the masking in a separate method step. In this case, a different plastic material can be used for the injection molding of the masking than for the second injection molding of the stator winding.

The masking can be arranged in the area of a radially inner end section and/or radially outer end section of the space. The cooling duct is thus arranged in this radially inner or outer end section, respectively, in response to the injection molding.

According to a further aspect of the disclosure, a protective coating, which is arranged in the space and which at least partially, typically completely, limits or surrounds the (first) cooling duct in a cross section perpendicular to the axial direction, is embodied by injection molding the masking with the plastic. It is ensured by said protective coating that no electrical contact of the coolant guided through the cooling duct with the stator windings arranged in the space as well as with the stator teeth limiting the space can be created.

According to another aspect of the disclosure, the protective coating can limit the at least one cooling duct radially on the inside and/or radially on the outside in the cross section perpendicular to the axial direction. An electrical insulation of the cooling duct or of the coolant guided through the cooling duct, respectively, relative to the stator winding arranged radially outside or inside the cooling duct, respectively, in the space is ensured in this way.

According to a further aspect of the disclosure, the protective coating can limit the at least one cooling duct in the circumferential direction of the stator in the cross section perpendicular to the axial direction. The electrical insulation of the cooling duct or of the coolant guided through the cooling duct, respectively, relative to the electrically conductive stator teeth is ensured in this way. According to an aspect of the disclosure, a first and a second masking are introduced into the space, so that a first and a second cooling duct are formed by injection molding of the two maskings. In this case, the first cooling duct is arranged in the radially inner end section and the second cooling duct in the radially outer end section.

According to another aspect of the disclosure, plastic is injected onto the surface sections of the two adjacent stator teeth defining the space in the course of the injection molding of the stator teeth according to step b). An unwanted electrical contact between the stator winding and the stator teeth—which are typically made of a metal, thus of an electrically conductive material—can be prevented in this way.

According to an aspect of the disclosure—in the case of this further development, the stator includes a stator body, from which the stator teeth protrude radially to the inside—plastic is applied to a surface section of the stator body limiting the space in the course of the injection molding of the stator teeth according to step b). An unwanted electrical contact between the stator winding and the stator body—which is typically made of a metal, thus of an electrically conductive material—can be prevented in this way.

According to an aspect of the disclosure, an electrically insulating layer, which covers the surface sections of the two adjacent stator teeth limiting the space and/or of the stator body, is formed by the plastic, which is injected onto the surface sections. An unwanted electrical contact between the stator winding and the stator teeth or the stator body, respectively—which are typically made of a metal, thus an electrically conductive material—can be prevented in this way.

According to a further aspect of the disclosure, at least one phase insulation, which divides the space into a radially inner and into a radially outer subspace, is embodied in the course of the injection molding with the plastic. First conductor elements of the stator winding, which embody a first phase winding, can be arranged in the radially inner subspace in this way. Second conductor elements of the stator winding, which embody a second phase winding, which is electrically insulated with respect to the first phase winding, can accordingly be arranged in the radially outer subspace. Conductor elements of the stator winding, which are electrically insulated from one another, can thus be arranged in the two subspaces. This, in turn, makes it possible to assign two different electrical phases, which have to be electrically separated from one another, to the two conductor elements, which are electrically insulated from one another by the phase insulation. It is conceivable that a plurality of such phase insulations are also provided in a space. A diameter of the phase insulation of the plastic, measured in the radial direction, is advantageously between 1 mm and 3 mm.

The phase insulation is formed in response to the injection molding of the stator teeth or in response to the injection molding of the stator winding or in a separate method step. This option is associated with particularly low production costs.

The phase insulation is formed in the course of the injection molding in such a way that it extends along the circumferential direction and connects the two insulating layers of the plastic, which are arranged on the adjacent stator teeth, to one another. The two formed subspaces are completely limited by the, typically electrically insulating, plastic in this way.

If the electrical machine produced by the method is to be connected to two different phases of an electrical current course during later operation, it is proposed to arrange first conductor elements of the stator winding in the radially inner subspace in step c), and to electrically connect them to one another for connection to a common first phase of the electrical current source. This connection can take place outside of the space or of the stator groove, respectively. Second conductor elements of the stator winding can analogously be arranged in the radially outer subspace in step c), and can be electrically connected to one another for connection to a common second phase of the electrical current source. This electrical connection can also take place outside of the space or of the stator groove, respectively.

In an exemplary embodiment, at least one first and/or second conductor element, typically all first and/or second conductor elements, are surrounded or enclosed, respectively, by the plastic after the second injection molding according to step d) in the cross section perpendicular to the axial direction. It is ensured in this way that no unwanted electrical short-circuit occurs between the individual stator windings as well as the coolant flowing through the cooling duct.

The first and/or second conductor elements can advantageously be embodied as winding rods of an electrically conductive material. These conductor elements are typically embodied so as to be mechanically stiff. Such an exemplary embodiment of the conductor elements as winding rods, in particular of a mechanically stiff material, makes it easier to introduce the conductor elements into the space of the stator teeth in order to assemble the electrical machine.

In an exemplary embodiment, at least one winding rod has the geometry of a rectangle including two narrow sides and including two broad sides in the cross section perpendicular to the axial direction, after the arrangement in the space. This typically applies for all of the winding rods arranged in the space.

The protective coating is typically formed in response to the injection molding of the stator teeth or in response to the injection molding of the stator winding or in a separate method step, depending on which plastic material is to be used.

In an exemplary embodiment, the cooling duct created in the area of the radially inner and/or outer end section of the space is created in the radially inner or outer subspace, respectively, which is formed of plastic by the phase insulation. In his exemplary embodiment, the second cooling duct created in the area of the radially outer or inner end section is alternatively or additionally created in the radially outer or inner subspace, respectively, which is formed of plastic of the phase insulation.

In an exemplary embodiment of the method, at least one air gap and/or at least one air trap is embodied at least in some areas between the at least two conductor elements and the electrical insulating layer arranged on the surface sections of the stator teeth. In this exemplary embodiment, said air gap or air trap, respectively, is filled, namely typically completely, with the plastic by forming a gap filling. If present, a plurality of such air gaps and/or air traps are filled, particularly all of the air gaps and/or air traps, which are present in the space. In the ideal case, no air gaps or air traps whatsoever, respectively, thus remain in the space after the second injection molding. An optimal electrical insulation of the stator winding relative to the stator body can be attained in this way by the stator teeth.

The at least one first conductor element can be electrically insulated relative to the at least one second conductor element by the phase insulation. An unwanted electrical short-circuit between two conductor elements, which are connected to different electrical phases of a current source, can be avoided in this way.

In an exemplary embodiment, the at least one first conductor element is arranged in the radially inner subspace and the at least one second conductor element in the radially outer subspace. This exemplary embodiment is particularly suitable if only little installation is available in the respective space and if the electrical machine is to be operated in two phases.

The space can advantageously have the geometry of a trapezoid, typically of a rectangle, in the cross section perpendicular to the axial direction.

In an exemplary embodiment, the plastic injected onto the surface sections of the stator teeth is formed by an electrically insulating first plastic material. The plastic embodying the at least one phase insulation can be formed by a second plastic material. The plastic embodying the first and/or second protective coating can furthermore be formed by the second plastic material or by a third plastic material, which differs from the second plastic material.

In an exemplary embodiment, the second plastic material is embodied to be electrically insulating or electrically conductive.

In a further exemplary embodiment, the third plastic material is embodied to be electrically insulating or electrically conductive.

In a further exemplary embodiment, the first plastic material and/or the second plastic material and/or the third plastic material can be a thermoplastic.

In a further exemplary embodiment, the first plastic material and/or the second plastic material and/or the third plastic material can be a thermoset.

The first and/or the second and/or the third plastic material have identical heat conductivities. The first and/or the second and/or the third plastic material can alternatively or additionally have different heat conductivities.

The first and/or the second and/or the third plastic material can be identical materials. However, the first and/or second and/or third plastic material can likewise also be different materials.

In an exemplary embodiment, the injection molding or filling, respectively, of the space with plastic takes place in such a way that an air gap and also an air trap is no longer present in the space after the injection molding or filling, respectively.

The disclosure further relates to a stator, which was produced by the above-described method. The above-described advantages of the method can thus also be transferred to the stator according to an aspect of the disclosure.

The disclosure further relates to an electrical machine including the above-mentioned stator, which is thus produced by the method according to an aspect of the disclosure. The above-described advantages of the method according to an aspect of the disclosure can thus also be transferred to the electrical machine. In addition to the stator, the electrical machine also includes a rotor, which is rotatable about an axis of rotation relative to the stator.

It goes without saying that the above-mentioned features and the features, which will be described below, cannot only be used in the respective specified combination, but also in other combinations or alone, without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
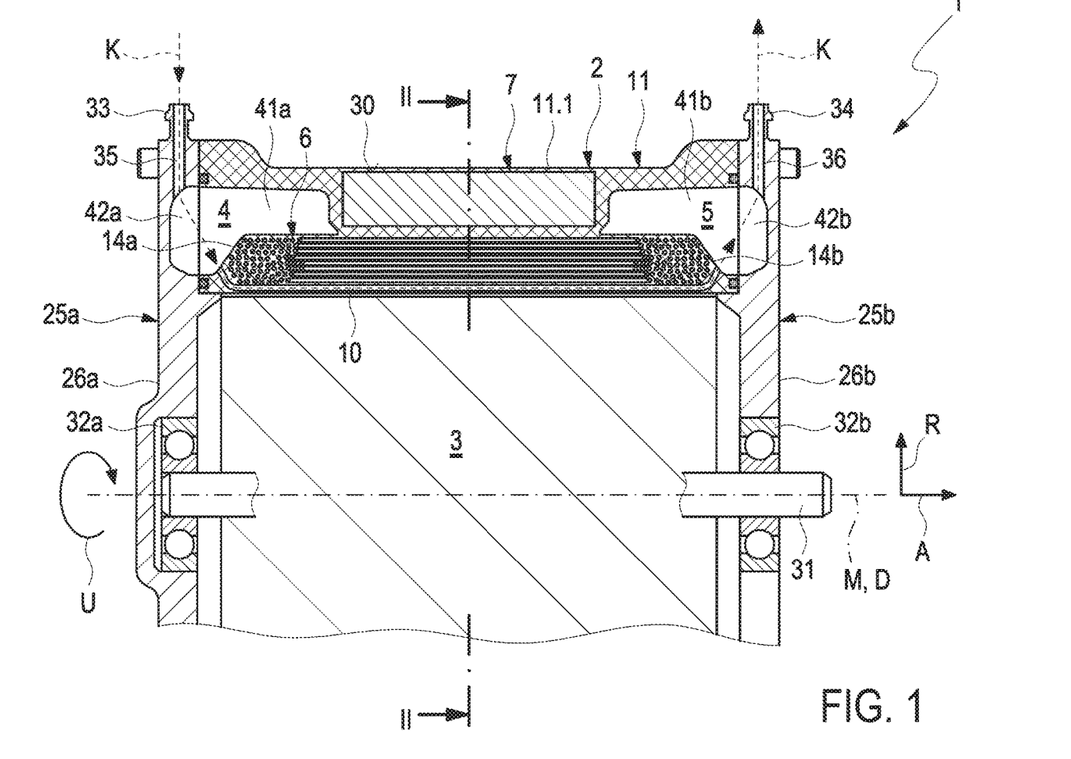
FIG. 1 shows an electrical machine in a longitudinal section along the axis of rotation of the rotor according to an exemplary embodiment of the disclosure.

FIG. 1 illustrates an electrical machine 1 according to an exemplary embodiment of the disclosure in a sectional illustration. The electrical machine 1 is dimensioned in such a way that it can be used in a vehicle, typically in a road vehicle.

Figure 2:
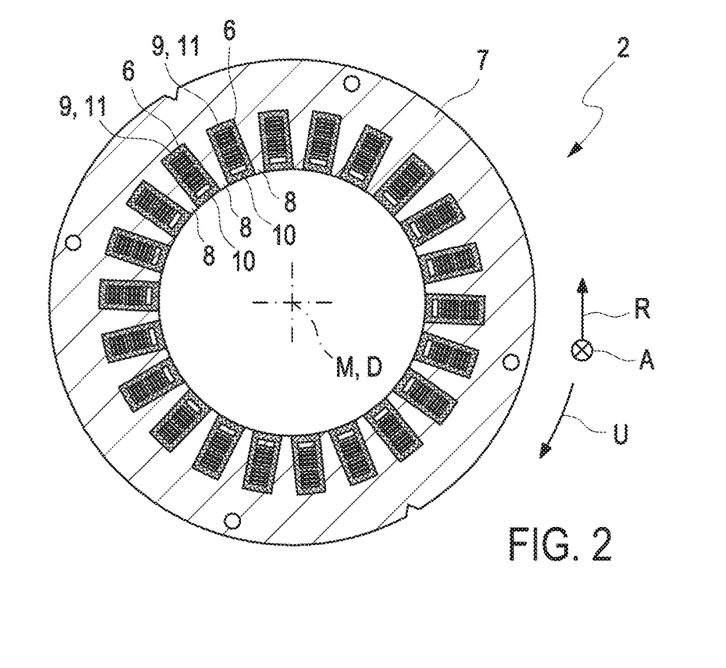
FIG. 2 shows the stator of the electrical machine shown in FIG. 1 in a cross sectional view perpendicular to the axis of rotation of the rotor.

The electrical machine 1 includes a rotor 3, which is only illustrated in a roughly schematic manner in FIG. 1, and a stator 2. For clarification, the stator 2 is illustrated in FIG. 2 in a cross sectional view perpendicular to the axis of rotation D along the sectional line II-II of FIG. 1. As shown in FIG. 1, the rotor 3 has a rotor shaft 31 and can have a plurality of magnets, which are not illustrated in more detail in FIG. 1, the magnetic polarization of which alternates along the circumferential direction U. The rotor 3 can be rotated about an axis of rotation D, the position of which is determined by the center longitudinal axis M of the rotor shaft 31. The axis of rotation D defines an axial direction A, which extends parallel to the axis of rotation D. A radial direction R is perpendicular to the axial direction A. A circumferential direction U rotates around the axis of rotation D.

As shown in FIG. 1, the rotor 3 is arranged in the stator 2. The electrical machine 1 shown in FIG. 1 is a so-called internal rotor. However, a realization as a so-called external rotor is also conceivable, in the case of which the rotor 3 is arranged outside of the stator 2. The rotor shaft 31 is supported on the stator 2 in a first shaft bearing 32a and, axially spaced apart therefrom, in a second shaft bearing 32b so as to be rotatable around the axis of rotation D.

In the known manner, the stator 2 furthermore includes a plurality of stator windings 6, which can be electrically energized so as to generate a magnetic field. The rotor 3 is set into rotation by magnetic interaction of the magnetic field, which is generated by the magnets of the rotor 3, with the magnetic field, which is generated by the electrically conductive stator windings 6.

It can be gathered from the cross section of FIG. 2 that the stator 2 can have a ring-shaped stator body 7, for example of iron. The stator body 7 can in particular be formed of a plurality of stator body plates (not shown), which are stacked on top of one another along the axial direction A and which are adhered to one another. A plurality of stator teeth 8, which extend along the axial direction A, protrude away from the stator body 7 radially to the inside, and which are arranged spaced apart from one another along the circumferential direction U, are molded on the stator body 7 radially on the inside. Each stator tooth 8 supports a stator winding 6. Together, the individual stator windings 6 form a winding arrangement. Depending on the number of the magnetic poles, which are to be formed by the stator windings 6, the individual stator windings 6 of the entire winding arrangement can be electrically wired together in a suitable manner.

During operation of the machine 1, the electrically energized stator windings 6 generate waste heat, which has to be dissipated from the machine 1, in order to prevent an overheating and damages to or even destruction of the machine 1 associated therewith. The stator windings 6 are thus cooled with the help of a coolant K, which is guided through the stator 2 and which absorbs the waste heat generated by the stator windings 6 by heat transfer.

To guide the coolant K through the stator 2, the machine 1 includes a coolant distributor chamber 4, into which a coolant K can be introduced via a coolant inlet 33. Along the axial direction A, a coolant collector chamber 5 is arranged at a distance from the coolant distributor chamber 4. The coolant distributor chamber 4 communicates fluidically with the coolant collector chamber 5 by a plurality of cooling ducts 10, of which only a single one can be seen in the illustration of FIG. 1. In a cross section perpendicular to the axial direction A, which is not shown in the figures, the coolant distributor chamber 4 and the coolant collector chamber 5 can each have a ring-shaped geometry. A plurality of cooling ducts 10, which each extend along the axial direction A from the ring-shaped coolant distributor chamber 4 to the ring-shaped coolant collector chamber 5, are arranged at a distance from one another along the circumferential direction U. The coolant K introduced into the coolant distributor chamber 4 via the coolant inlet 33 can thus be distributed to the individual cooling ducts 10. After the flow-through of the cooling ducts 10 and the absorption of heat from the stator windings, the coolant K is collected in the coolant collector chamber 5 and is discharged from the machine 1 again via a coolant outlet 34 provided on the stator 2.

As can be seen in FIGS. 1 and 2, the stator windings 6 and the coolant ducts 10 are arranged in spaces 9, which are in each case embodied between two stator teeth 8, which are adjacent in the circumferential direction U. Said spaces 9 are also known to the pertinent person of skill in the art as so-called "stator grooves" or "stator slots", which extend along the axial direction A, as do the stator teeth 8.

Figure 3:
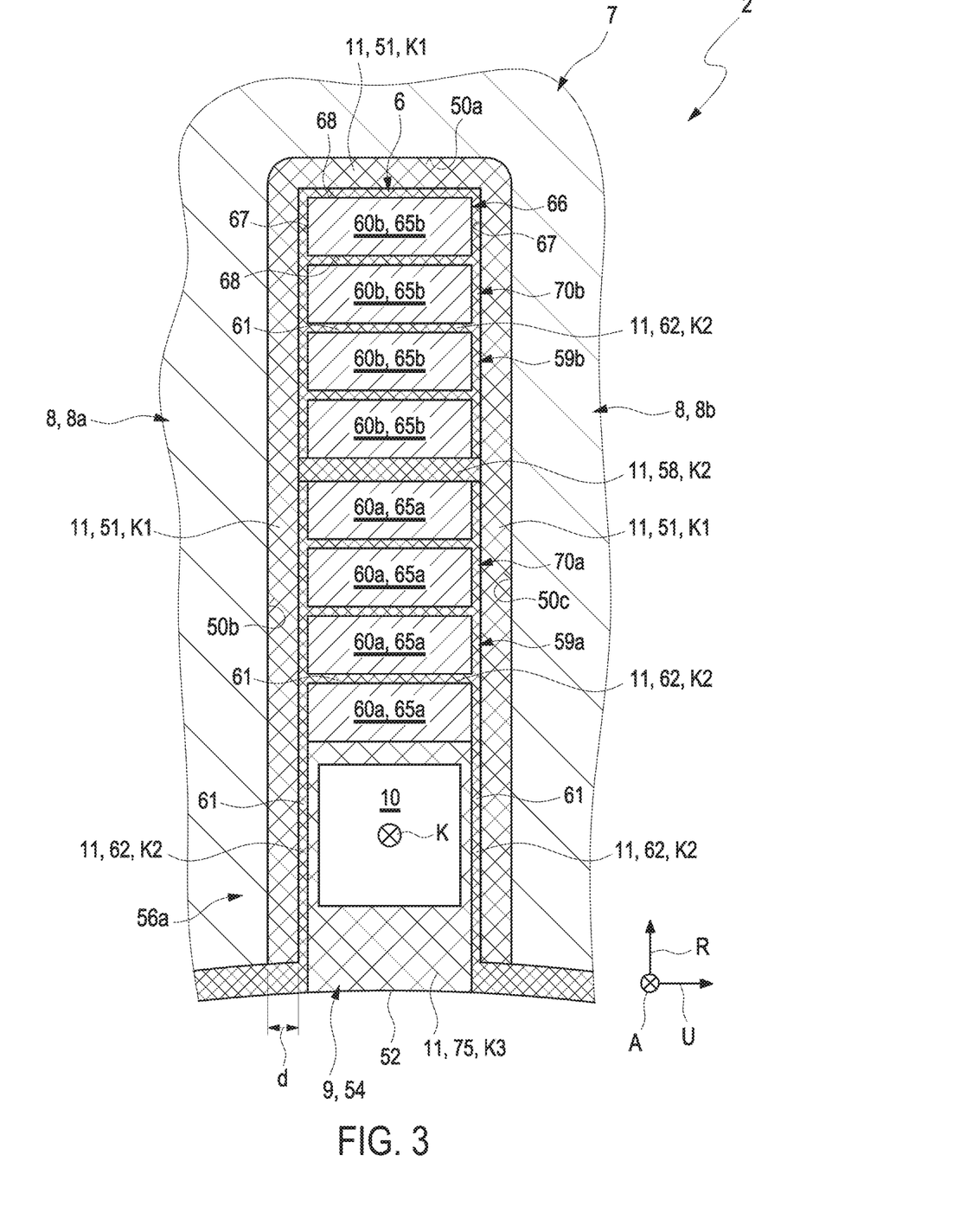
FIG. 3 shows a detail illustration of the stator of FIG. 2 in the area of a space between two stator teeth, which are adjacent in the circumferential direction.

FIG. 3 will be described below, which shows a space 9 embodied between two stator teeth 8—hereinafter also referred to as stator teeth 8a, 8b—which are adjacent in the circumferential direction U, in a detail illustration.

As shown FIG. 3, the space 9 has an opening 52 radially on the inside, is thus embodied so as to be open radially on the inside. In the exemplary embodiment shown in FIG. 3, the cooling duct 10 is arranged in the area of a radially inner end section 56a of the space 9 or of the stator groove 54, respectively, thus in the area of the opening 52.

To improve the heat transfer of the waste heat generated by the stator windings 6 to the coolant K flowing through the cooling ducts 10, an electrically insulating and heat conducting plastic 11 is arranged in addition to a cooling duct 10 and a stator winding 6 in the spaces 9 in accordance with FIG. 3.

The plastic 11 is typically introduced into the space 9 by injection molding.

As can be seen in FIG. 3, the plastic 11 is arranged on surface sections 50a, 50b, and 50c of two stator teeth 8, which are adjacent in the circumferential direction U and which, together, limit the space 9. It is ensured in this way that the cooling duct 10 arranged in the space 9 as well as the stator winding 6 arranged in the same space 9 is in each case electrically insulated relative to the stator teeth 8 by means of the electrically insulating plastic 11. The stator winding 6 is furthermore connected to the cooling duct 10 in a heat conducting manner via the plastic 11, so that waste heat generated in or by the stator winding 6, respectively, can be transferred to the coolant K flowing through the cooling duct 10 via the plastic 11 and can thus be discharged from the stator winding 6.

A surface section 50a of the two stator teeth 8a, 8b, which are adjacent in the circumferential direction U, located radially opposite the opening 52—hereinafter identified as "fist surface section" and additionally provided with reference numeral 50a—forms a so-called groove base of the stator groove 54 formed by the space 9. A first front side, which limits the space 9 in the circumferential direction U, of a first one of the two adjacent stator teeth 8—hereinafter additionally identified with 8a—embodies a second surface section 50b. A second front side, which also limits the space 9 in the circumferential direction U, of a second one of the two adjacent stator teeth 8—hereinafter additionally identified with 8b—embodies a third surface section 50c, which is located opposite the second surface section 50b in the circumferential direction U.

The plastic 11 arranged on the three surface sections 50a, 50b, and 50c embodies an electrically insulating and heat conducting insulating layer 51, which covers the surface sections 50a, 50b, and 50c. A layer thickness d of the insulating layer 51 can, for example, be between 0.2 mm and 0.5 mm.

It can be seen that the plastic 11 does not only embody the electrical insulating layer 51, but also a first protective coating 75, which is arranged in the space 9 and which surrounds and limits the cooling duct 10 in this way. The provision of a tube body or the like for the fluid-tight limitation of the cooling duct 10 in such a way that no coolant K can escape therefrom, is thus superfluous.

In the exemplary embodiment shown in FIG. 3, the first protective coating 75 closes the opening 52 of the space 9, which is embodied so as to be open, or of the stator groove 54, respectively. As can further be seen in FIG. 3, the stator winding 6 is also not only electrically insulated relative to the cooling duct 10 via the plastic 11, which forms the first protective coating 75, but is also connected thereto in a heat conducting manner, so that waste heat generated in or by the stator winding 6, respectively, can also be transferred to the coolant K flowing through the cooling duct 10 via the first protective coating 75.

As shown in FIG. 3, the plastic 11 cannot only embody the first protective coating 75 and the insulating layer 51, but—alternatively or additionally—also a phase insulation 58 arranged in the space 9 or in the stator groove 54, respectively. The phase insulation 58 divides the space 9 into a radially inner and into a radially outer subspace 59a, 59b.

The phase insulation 58 advantageously extends along the circumferential direction U. The phase insulation 58 typically connects the second surface section 50b to the third surface section 50c.

The first conductor elements 60a are arranged in the radially inner subspace 59a and the second conductor elements 60b in the radially outer subspace 59b.

The first cooling duct 10 arranged in the area of the radially inner end section 54a is arranged in the radially inner subspace 59a, which is formed of plastic 11 by the phase insulation 58.

As shown in FIG. 3, the stator winding 6 arranged in the space 9 includes first conductor elements 60a and second conductor elements 60b, which are arranged next to one another and at a distance from one another along the radial direction R in the space 9. An air gap 61, which can typically extend along the circumferential direction U, is embodied between two conductor elements 60 and 60b, which are each adjacent along the radial direction R. The plastic 11 thereby embodies a gap filling 62, with which the air gap 61 is filled completely.

An air gap 61, which can extend along the radial direction R, is embodied in a similar manner between the first and second conductor elements and the electrical insulating layer 51 arranged on the surface sections 50a, 50b, and 50c of the stator teeth 8, 8a, and 8b. The plastic 11 thereby embodies a gap filling 62, with which the air gap 61 is filled completely.

All first and second conductor elements 60a and 60b are thus surrounded by the electrically insulating and heat conducting plastic 11 in the cross section perpendicular to the axial direction A as illustrated in FIG. 3.

The first and second conductor elements 60a and 60b, each as first or second winding rods 65a and 65, respectively, are made of an electrically conductive and mechanically stiff material.

In the cross section perpendicular to the axial direction A, the first and second winding rods 65a and 65b each have the geometry of a rectangle 66 including two narrow sides 67 and two broad sides 68. The two broad sides 68 of two adjacent winding rods 65a or 65b, respectively, are located opposite one another with respect to the radial direction R and limit the respective air gap 61 in the radial direction R in this way.

Figure 4:
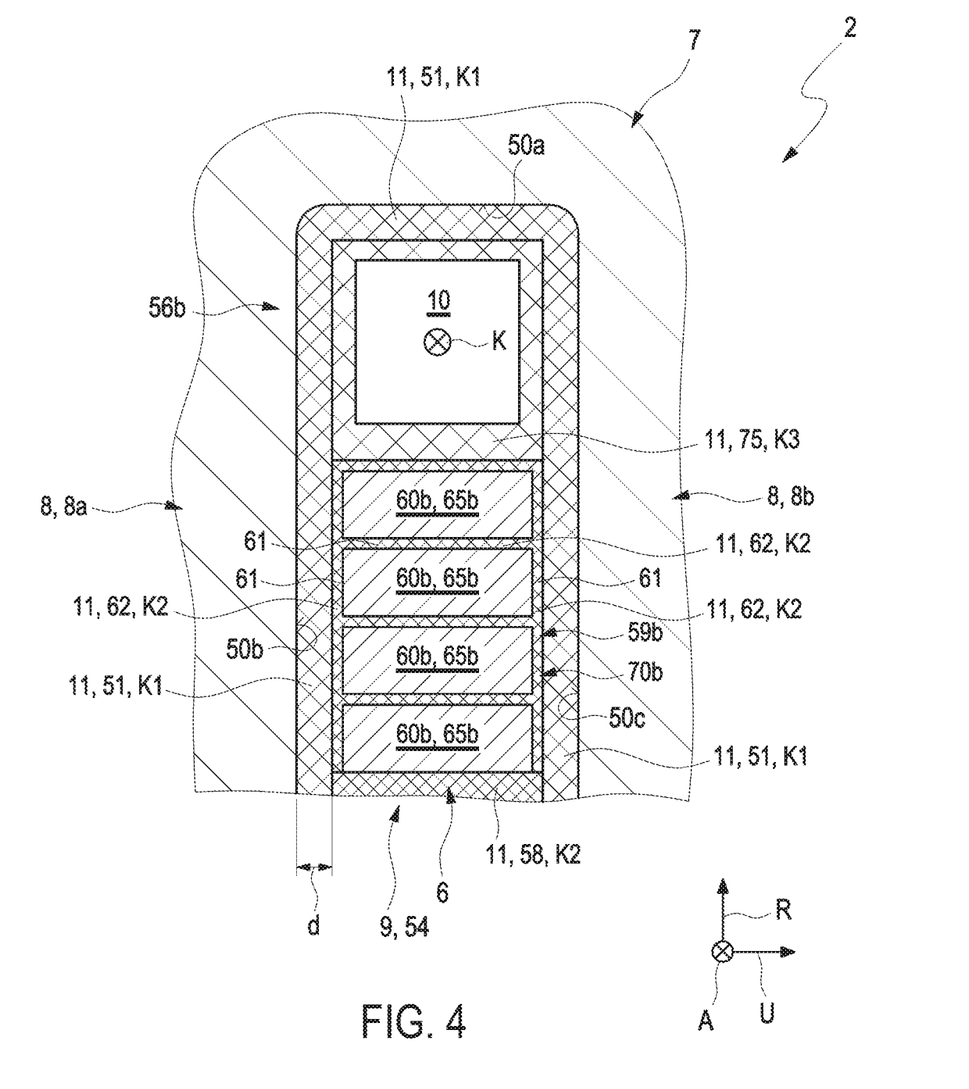
FIG. 4 shows a further development of the exemplary embodiment shown in FIG. 3 including an additional, second cooling duct.

FIG. 4 shows a further development of the exemplary embodiment shown in FIG. 3. The exemplary embodiment shown in FIG. 4 differs from that shown in FIG. 3 in that a cooling duct 10 is arranged in the area of a radially outer end section 56a of the space 9 or of the stator groove 54, respectively, which is located opposite to the radially inner end section 56a with respect to the radial direction R of the space 9.

In the example of FIG. 4, the plastic 11—analogously to the first protective coating 75 of the coolant 10—embodies a second protective coating 75, which is arranged in the space 9 and which limits and thus surrounds the additional cooling duct 10. As can be seen in FIG. 4, the additional cooling duct 69, which is arranged in the radially outer end section 56b, is arranged in the radially outer subspace 59b of the space 9 or of the stator groove 54, respectively, which is formed by the phase insulation 58 formed by the plastic 11.

In the event that the plastic 11 cracks due to thermal overload or is damaged in another way, an unwanted electrical short-circuit of the stator winding 6 can be avoided in this way by the material of the stator body 7 or of the stator teeth 8 or 8a, 8b, respectively—typically iron or another suitable, electrically conductive material.

Figure 5:
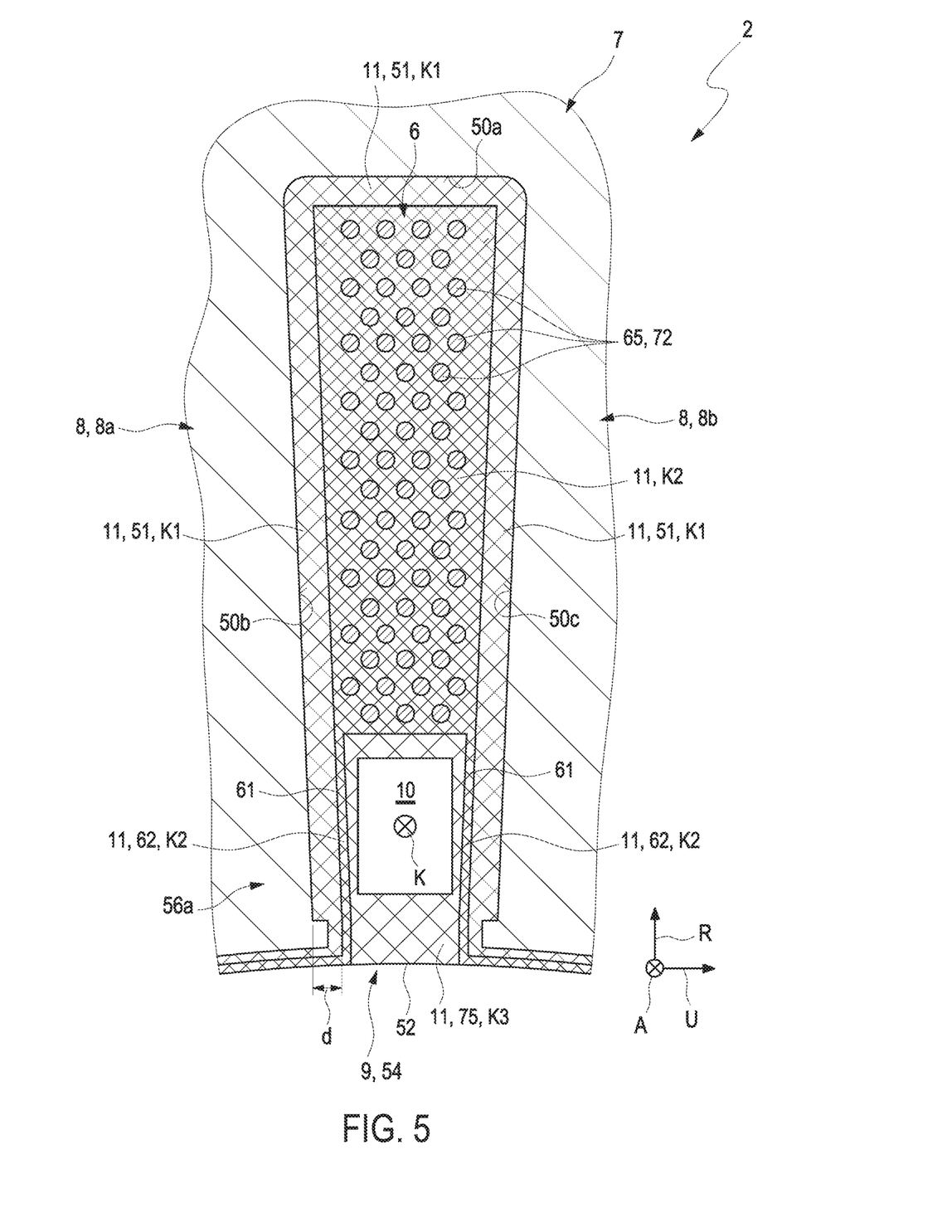
FIG. 5 shows a further development of the exemplary embodiment shown FIG. 3, in the case of which the stator windings are not formed by winding rods, but by winding wires formed in a plastic compound.

FIG. 5 shows further development of the exemplary embodiment shown in FIG. 3. In the exemplary embodiment shown in FIG. 5, the plastic forms a plastic compound, into which the stator winding is embedded. In the exemplary embodiment shown in FIG. 5, the conductor elements 65 of the stator winding 6 are formed by winding wires 72, which are part of a distributed winding.

Reference will be made below to FIG. 1 again. As shown in FIG. 1, the stator 2 including the stator body 7 and the stator teeth 8 is axially arranged between a first and a second end shield 25a and 25b.

As shown in FIG. 1, a portion of the coolant distributor chamber 4 is arranged in the first end shield 25a and a portion of the coolant collector chamber 5 in the second end shield 25b. The coolant distributor chamber 4 and the coolant collector chamber 5 are thus each partially formed by a hollow space 41a and 41b, which is provided in the plastic 11. By a hollow space 42a embodied in the first end shield 25a, the first hollow space 41a is thereby supplemented to form the coolant distributor chamber 4. The second hollow chamber 41b is accordingly supplemented to form the coolant collector chamber 5 by a hollow space 42b embodied in the second end shield 25b. In the case of the above-described embodiment option, the plastic 11 thus at least partially limits the coolant distributor chamber 4 as well as the coolant collector chamber 5.

A coolant supply 35, which fluidically connects the coolant distributor chamber 4 to a coolant inlet 33, which is provided on the first end shield 25a on the outside, in particular circumferentially as illustrated in FIG. 1, can further be embodied in the first end shield 25a. A coolant discharge 36, which fluidically connects the coolant collector chamber 5 to a coolant outlet 34, which is provided on the end shield 25b on the outside, in particular circumferentially as shown in FIG. 1, can accordingly be embodied in the second end shield 25b. This provides for an arrangement of the coolant distributor chamber 4 or of the coolant collector chamber 5, respectively, radially outside on the first or second end section 14a and 14b, respectively, of the respective stator winding 6 and also in the extension of these end sections 14a and 14b along the axial direction A. The end sections 14a and 14b of the stator windings 6, which are particularly loaded thermally during operation of the machine 1, are cooled particularly effectively by this measure.

As shown in FIG. 1, the plastic 11 can also be arranged on an outer circumferential side 30 of the stator body 7 and can thus embody a plastic coating 11.1 on the outer circumferential side 30. The stator body 7 of the stator 2, which is typically formed of electrically conductive stator plates, can thus be electrically insulated against the surrounding area. The provision of a separate housing for accommodating the stator body 7 can thus be forgone.

Figure 6:
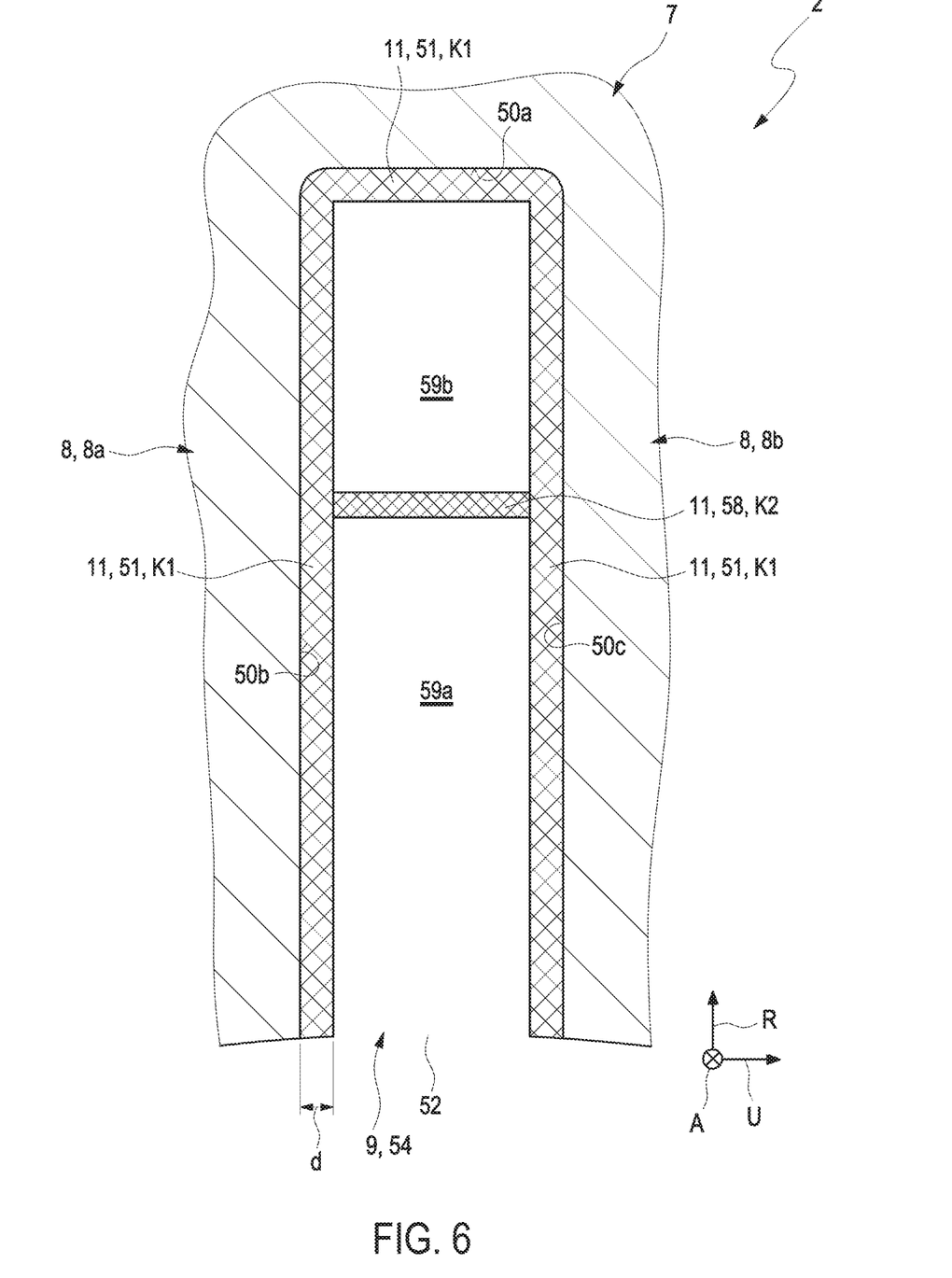
FIGS. 6 to 9 show illustrations of a sequence of the method according to an exemplary embodiment of the disclosure.

The method according to the disclosure will be described below in an exemplary manner:

As shown in FIG. 6, the stator 2 including the two stator teeth 8a and 8b, which are adjacent in the circumferential direction U, and the space 9 limited by these two stator teeth 8a and 8b is arranged in a first step a).

According to a second step b), the two stator teeth 8a and 8b, which are adjacent in the circumferential direction U, are injection molded with the electrically insulating and heat conducting plastic 11. In the course of the injection molding of the stator teeth 8a and 8b, electrically insulating plastic 11 is injected onto the surface sections 50b and 50c of the two adjacent stator teeth 8a and 8b, which limit the space 9. An electrically insulating layer 51, which covers the surface sections 50b and 50c of the two adjacent stator teeth 8, 8a, and 8b, which limit the space 9, is formed by the plastic 11, which is injected onto the surface sections 50b and 50c of the stator teeth 8a and 8b. The insulating layer 51 likewise covers a surface section 50a of stator body 7, which limits the space 9 radially on the outside.

As furthermore illustrated in FIG. 6, a phase insulation 58, which divides the space 9 into a radially inner and into a radially outer subspace 59a and 59b, can be formed in the space 9 in the course of the injection molding with the plastic 11 or by injection molding with the plastic 11, respectively. First conductor elements of the stator winding 6, which embody a first phase winding 70a, can then later be arranged in the radially inner subspace 59a. Second conductor elements of the stator winding 6, which embody a second phase winding 70b, which is electrically insulated with respect to the first phase winding 70b, can accordingly be arranged in the radially outer subspace 59b.

The phase insulation 58 advantageously extends along the circumferential direction U of the stator 2, so that it connects the two insulating layers 51 of the plastic 11, which are arranged on the adjacent stator teeth 8a and 8b, to one another.

In a further, third method step c), stator windings 6 are arranged on the stator teeth 8, 8a, and 8b. This means that, as shown in FIG. 7, at least one stator winding 6 is partially arranged in the space 9.

Figure 7:
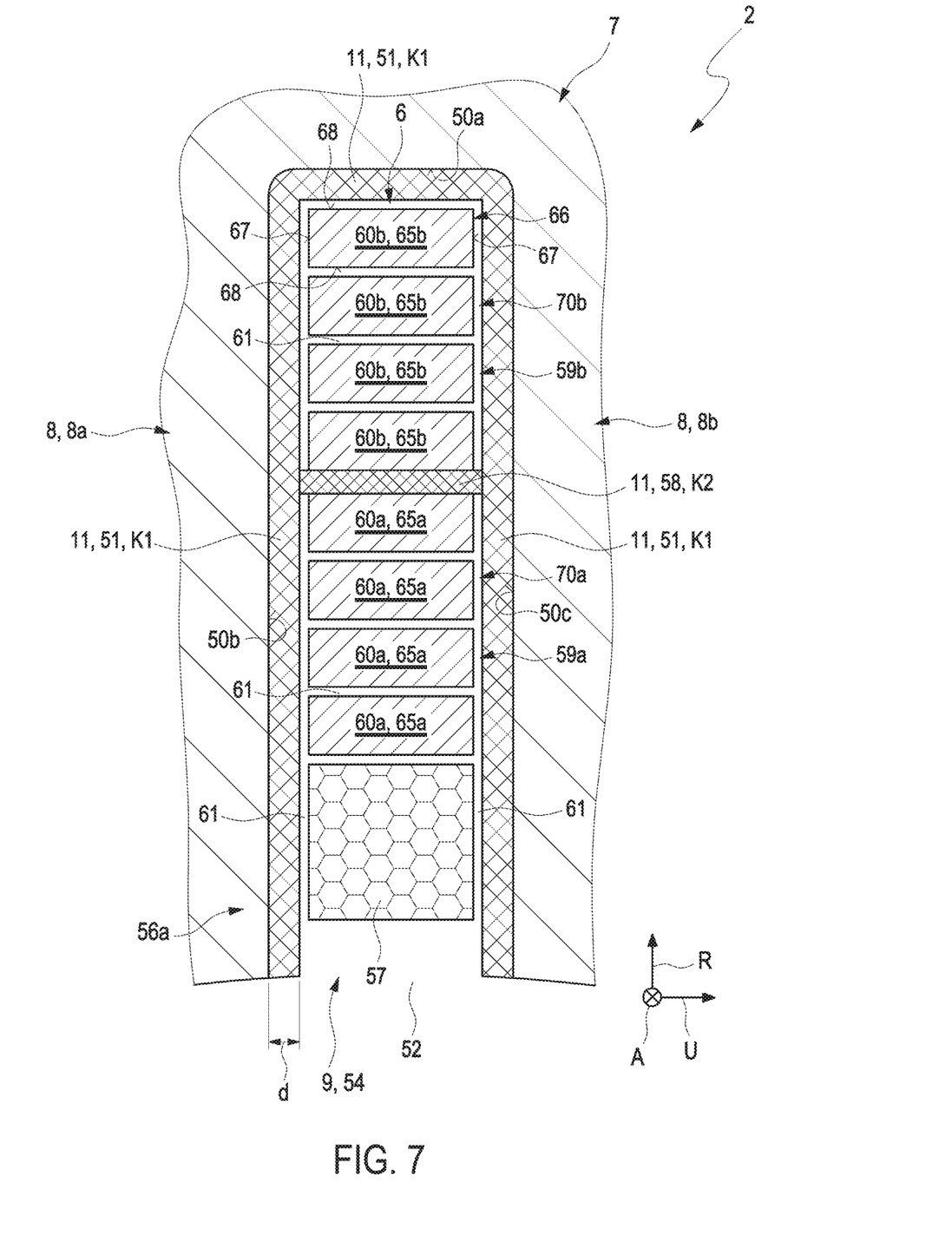

As shown in FIG. 7, the stator winding 6 arranged in the space 9 has first conductor elements 60a and second conductor elements 60b. The first and second conductor elements 60a and 60b are arranged next to one another and at a distance from one another in the space 9 along the radial direction R of the stator 2 or of the stator body 7, respectively.

In step c), the first conductor elements 60a of the stator winding 6 are arranged in the radially inner subspace 59a, and the second conductor elements 60b of the stator winding 6 are arranged in the radially outer subspace 59b. The first conductor elements 60a can thus be electrically connected to one another for connection to a common first phase of an electrical current source (not shown). The second conductor elements 60b can accordingly be electrically connected to one another for connection to a common second phase of the electrical current source.

The first and second conductor elements 60a and 60b are embodied as winding rods 65a and 65b of an electrically conducting material and so as to be mechanically stiff. After the arrangement in the space 9, the winding rods 65a and 65b have the geometry of a rectangle 66 including two narrow sides 67 and including two broad sides 68 in the cross section perpendicular to the axial direction A.

For the exemplary embodiment of a cooling duct 10, a masking 57 can be introduced into the space 4 between the two stator teeth 8a and 8b, namely in the area of a radially inner end section 56a of the space 9, as shown for example in FIG. 7.

As shown in FIG. 7, a respective air gap 61, in which in particular no plastic 11 is present, can be created after the arrangement of the stator winding 6 including the first and second conductor elements 60a and 60b in the space 9 between two respective adjacent conductor elements 60a and 60b. This air gap 61 can also be created between the conductor elements 60a and 60b and the insulating layer 51 arranged on the surface sections 50a, 50b, and 50c. Instead of an air gap 61, an exemplary embodiment of one or of a plurality of air traps (not shown) is also conceivable.

Figure 8:
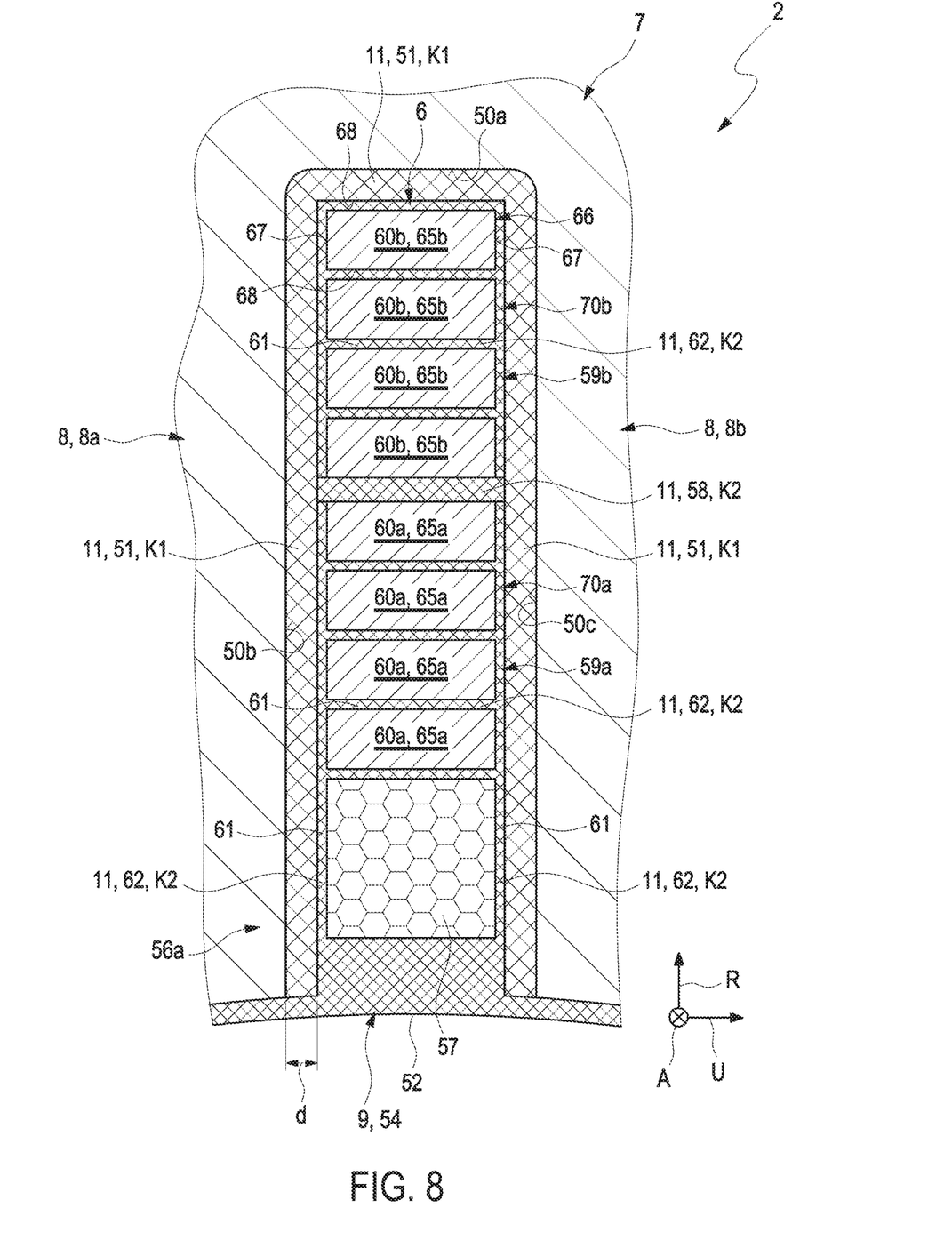

As shown in FIG. 8, a further injection process now takes place. In the course of a second injection molding according to a fourth method step d), the stator winding 6, which is arranged in the space 9 and which includes the first and second conductor elements 60a and 60b, is injection molded with the plastic 11, so that at least one air gap 61, typically all air gaps and air traps, which are present in the space 9, are filled with the plastic 11. After the filling of the air gap 61 with the gap filling 62 of the plastic 11, the first and second conductor elements 60a and 60b are in each case completely surrounded by the electrically insulating and heat conducting plastic in the cross section perpendicular to the axial direction A. The injection molding or filling, respectively, of the space 9 with the plastic 11 in particular takes place in such a way that an air gap 11 or air trap, respectively, is no longer present in the space 9 after the injection molding or filling, respectively.

As shown in FIG. 8, the injection molding of the masking 57 can also take place in the course of the second injection molding. In the course of this injection process, the masking 57 is injection molded with the plastic 11, so that the volume of the space 9 filled by the masking 57 remains free so as to embody a cooling duct 10 in response to this injection molding. It is conceivable that the injection molding of the masking 57 is performed in a separate method step.

Figure 9:
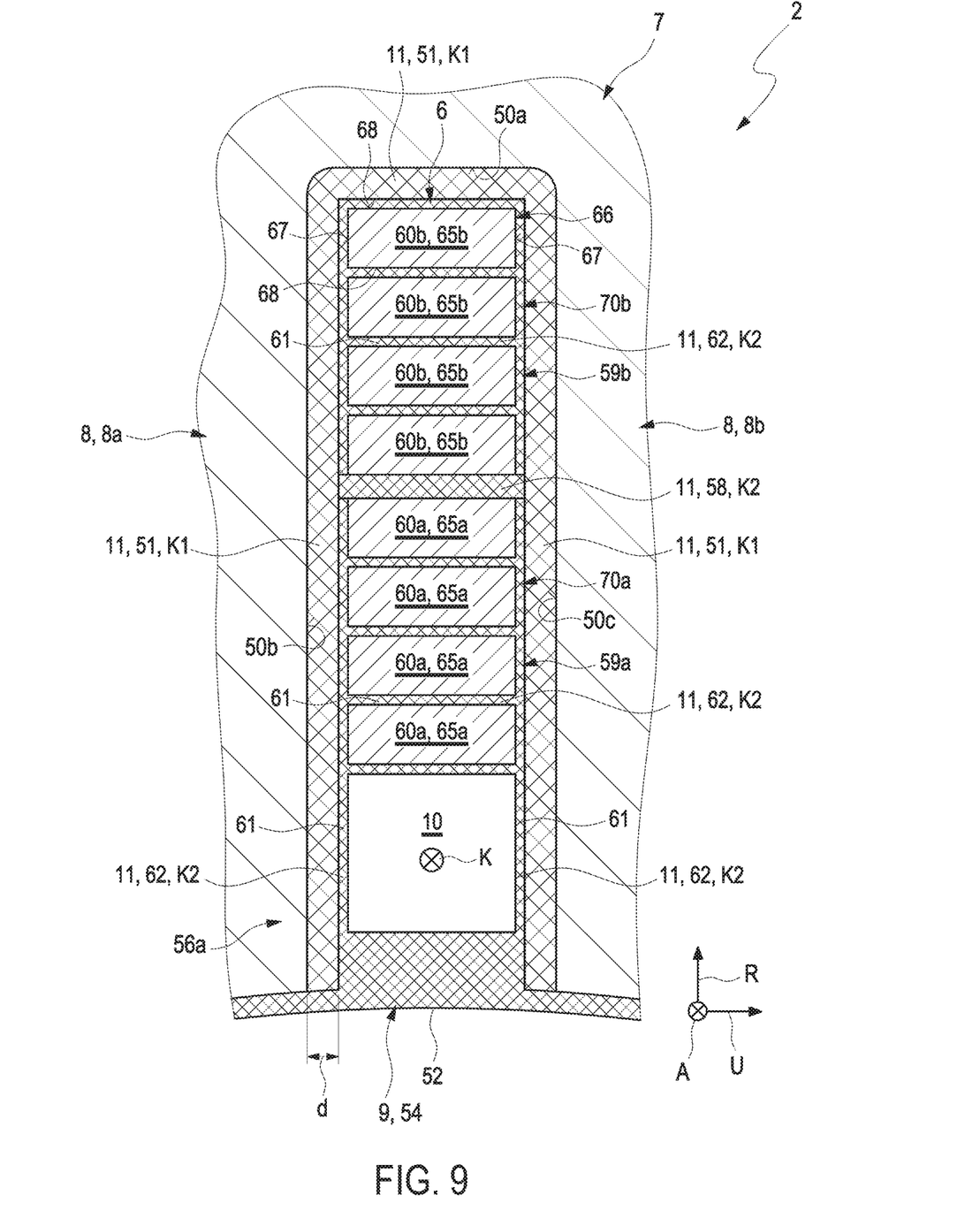

After the removal of the masking 57, the desired cooling duct 10 is formed, which is shown in FIG. 9.

In one exemplary embodiment, the masking 57 cannot be arranged in the area of the radially inner end section 56a, but in the area of a radially outer end section 56b of the space 9 (not shown in FIGS. 8 and 9). The cooling duct 10 is then created accordingly in the radially outer end section 56b (not shown in FIGS. 8 and 9).

Figure 10:
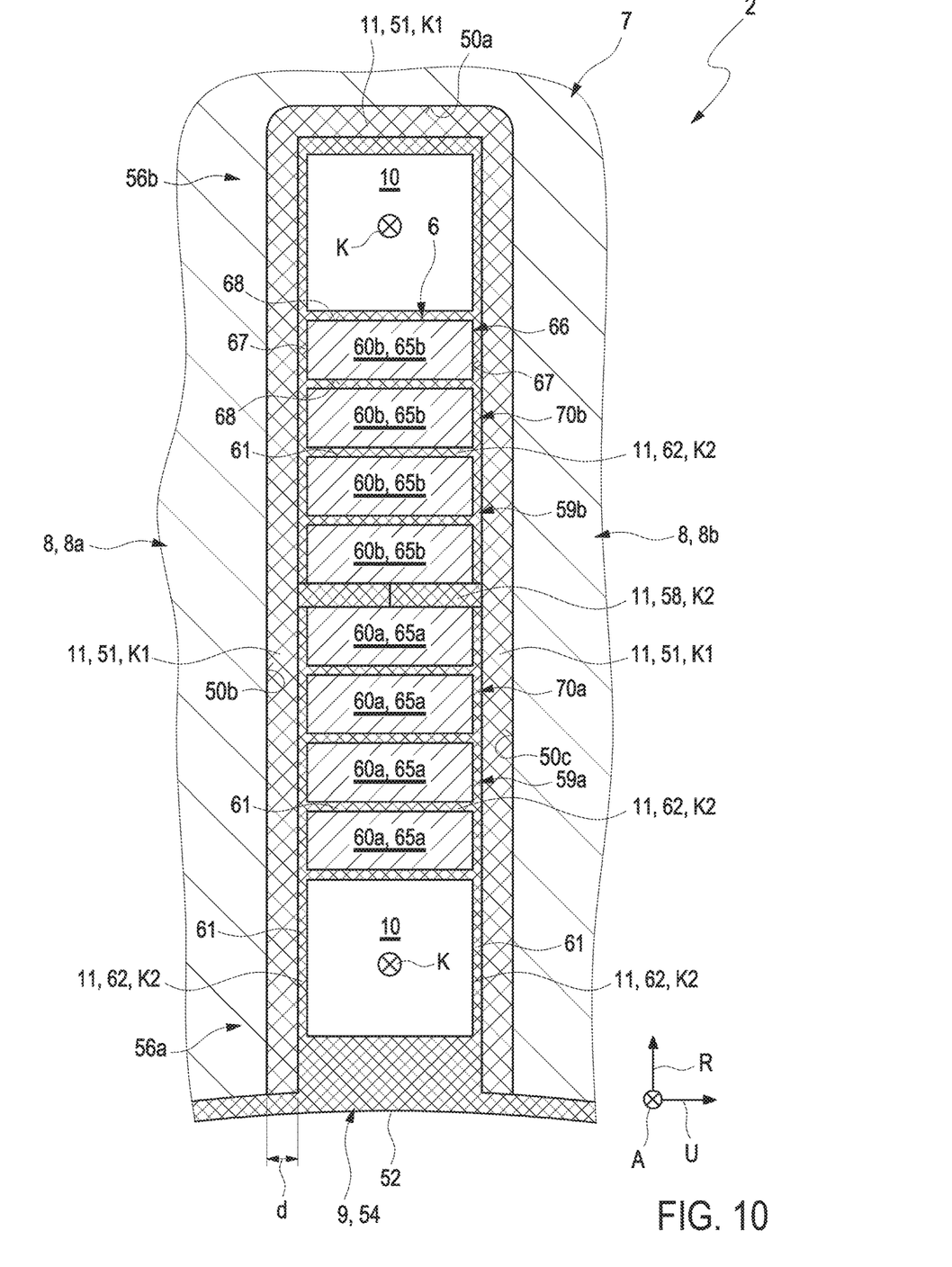
FIG. 10 shows a first further development of the exemplary embodiment shown in FIG. 3.

The combined use of two maskings 57 in the radially inner as well as radially outer end section 56a and 56b is also conceivable as shown in FIG. 10, so that two cooling ducts 10 are created accordingly, so that a first cooling duct 10 is created in the radially inner end section 56a and a second cooling duct 10 in the radially outer end section 56b. The first cooling duct 10 is thus arranged in the radially inner subspace 59a including the first conductor elements 60a. The second cooling duct 10 is accordingly arranged in the radially outer subspace 59b including the second conductor elements 60b.

The phase insulation 58 (see FIG. 6) can be formed in response to the injection molding of the stator teeth 8, 8a, and 8b or, alternatively, in response to the injection molding of the stator winding 6 or, alternatively, in a separate method step.

Figure 11:
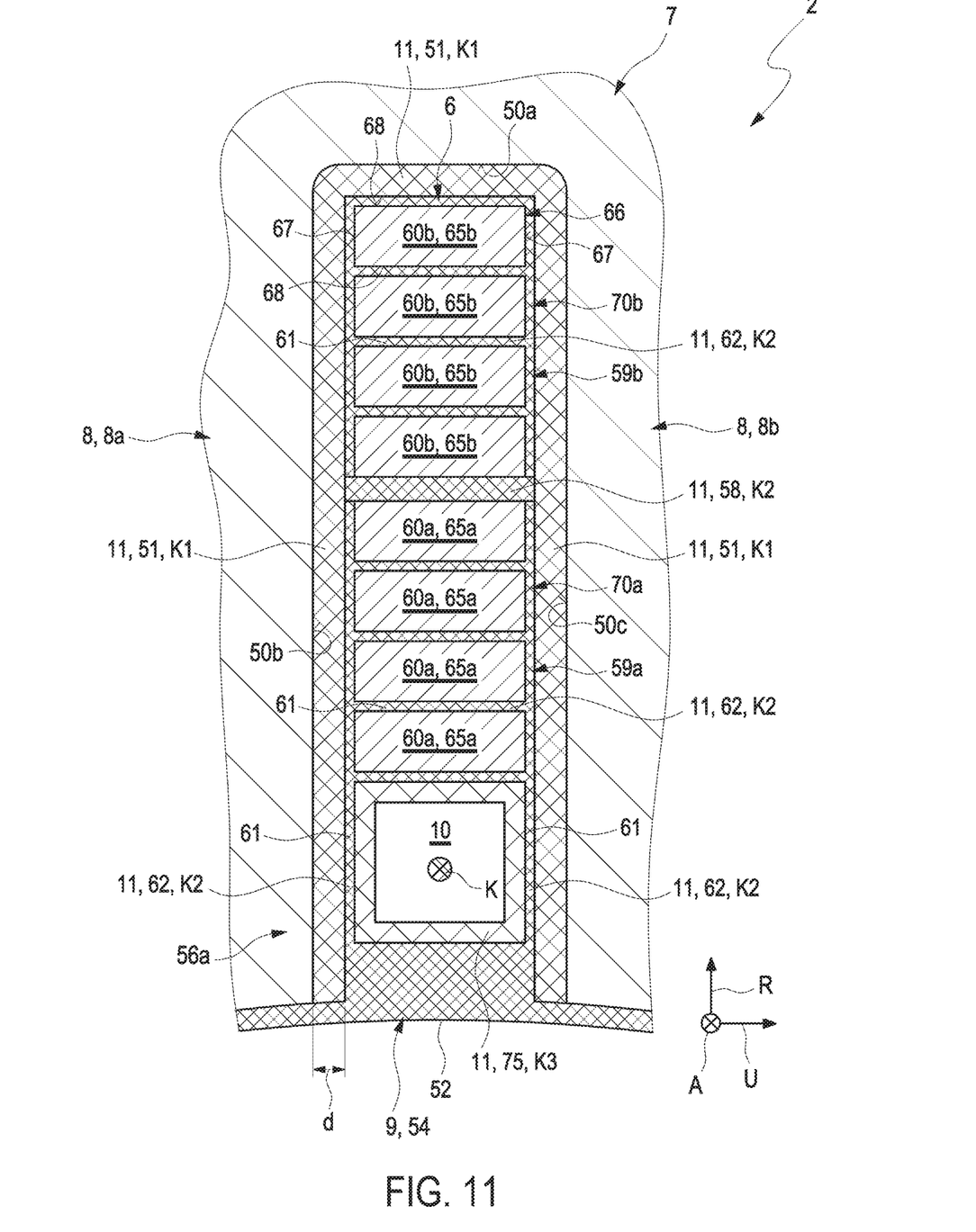
FIG. 11 shows a second further development of the exemplary embodiment shown in FIG. 3.

To ensure an optimal electrical insulation of the cooling duct 10 relative to the stator teeth 8a and 8b or the stator winding 6, respectively, a protective coating 75, which is arranged in the space 9 and which limits or surrounds the cooling duct 10, respectively, in the cross section perpendicular to the axial direction A, can be embodied in a further exemplary embodiment shown in FIG. 11 by additional injection molding of the masking 57 with plastic 11.

The protective coating 75 limits the at least one cooling duct 10 radially on the inside and radially on the outside in the cross section perpendicular to the axial direction A. It is likewise advantageous when said protective coating 75 limits the cooling duct 10 in the circumferential direction U of the stator 2 in the cross section perpendicular to the axial direction A.

The protective coating 75 can be formed in response to the injection molding of the stator teeth or in response to the injection molding of the stator winding or—this is the case in FIG. 11—in a separate method step.

The space 9 can have the geometry of a trapezoid, typically of a rectangle, in the cross section perpendicular to the axial direction A.

The plastic 11, which is injected onto the surface sections 50a, 50b, and 50c of the stator teeth 8a and 8b, is formed by a first plastic material K1. The plastic 11 embodying the phase insulation 58 is formed by a third plastic material K3. The plastic embodying the first and second gap filling 62 is formed by a second plastic material K2. The plastic 11 embodying the protective coating 75 is formed by the second plastic material K2 or by the third plastic material K3.

The three plastic materials K1, K2, and K3 can be identical materials. It is also conceivable, however, that at least two of the three plastic materials K1, K2, and K3—thus also all three plastic materials K1, K2, and K3—are different materials. In the example scenario, the first as well as the second and the third plastic material are embodied so as to be electrically insulating. Each of the three plastic materials K1, K2, and K3 can generally be a thermoplastic or a thermoset. The three plastic materials K1, K2, and K3 can also have identical heat conductivities. Alternatively, at least two of the three plastic materials K1, K2, and K3—thus also all three plastic materials K1, K2, and K3—can each have different heat conductivities. The three plastic materials K1, K2, and K3 can furthermore be identical materials. Alternatively, at least two of the three plastic materials K1, K2, and K3—thus also all three plastic materials K1, K2, and K3—can each be different materials.

It is understood that the foregoing description is that of the exemplary embodiments of the disclosure and that various changes and modifications may be made thereto without departing from the spirit and scope of the disclosure as defined in the appended claims.

What is claimed is:

1. A method for producing a stator for an electrical machine, the method comprising the steps of:
   (a) providing the stator including a plurality of stator teeth arranged spaced apart from one another along a circumferential direction of a stator body and a ring-shaped stator body, from which the plurality of stator teeth for accommodating stator windings protrude, wherein a space is in each case embodied between two stator teeth adjacent to one another in the circumferential direction;
   (b) first injection molding of at least two stator teeth adjacent to one another in the circumferential direction with a plastic;
   (c) arranging at least one stator winding in the space; and
   (d) second injection molding of the at least one stator winding arranged in the space with the plastic, such that an air gap and/or air trap formed between the stator teeth injection molded in step (b) and the at least one stator winding after arranging the at least one stator winding in the space according to step (c), is filled with the plastic, wherein at least one phase insulation, which is arranged in the space and which divides the space into a radially inner and into a radially outer subspace, is embodied during the injection molding with the plastic, such that first conductor elements of the at least one stator winding, which embody a first phase winding, can be arranged in a radially inner subspace, and second conductor elements of the at least one stator winding, which embody a second phase winding, which is electrically insulated with respect to the first phase winding, can be arranged in the radially outer subspace.

2. The method according to claim 1, wherein an electrically insulating plastic is used at least in response to the first injection molding and/or additionally in response to the second injection molding.

3. The method according to claim 1, wherein at least one masking, which is introduced into the space between the two stator teeth, is at least partially injection molded with the plastic, such that a volume of the space, which is filled by the at least one masking in response to the injection molding, remains free so as to embody a cooling duct.

4. The method according to one of claim 3, further comprising:
injection molding the at least one masking during the second injection molding; or
injection molding the at least one masking in a separate method step.

5. The method according to claim 3, wherein:
the at least one masking is arranged in a radially inner end section and/or in a radially outer end section of the space, and
a cooling duct is arranged in the radially inner end section or in the radially outer end section in response to the injection molding.

6. The method according to claim 1, wherein the phase insulation is formed in response to the injection molding of the stator teeth or in response to the injection molding of the at least one stator winding or in a separate method step.

7. The method according to claim 1, wherein the phase insulation extends along the circumferential direction and connects an insulation layer of the plastic arranged on adjacent stator teeth to one another.

8. The electrical machine according to claim 1, wherein:
the plastic injected onto surface sections of the stator teeth is made of an electrically insulating first plastic material,
the plastic embodying at least one phase insulation is made of a second plastic material, and
the plastic embodying a first protective coating and/or a second protective coating is made of the second plastic material or of a third plastic material.

9. The electrical machine according to claim 8, wherein:
the second plastic material is electrically insulating; and/or
the third plastic material is electrically conductive.

10. The electrical machine according to claim 8, wherein:
at least one of the first plastic material, the second plastic material, or the third plastic material is a thermoplastic, and
at least one of the first plastic material, the second plastic material, or the third plastic material is a thermoset.

11. The electrical machine according to claim 8, wherein at least one of the first, second, or third plastic materials have identical heat conductivities.

12. The electrical machine according claim 8, wherein
at least two of the first, second, or third plastic materials are made of different materials.

13. The electrical machine according to claim 8, wherein:
the second plastic material is electrically insulating; and/or
the third plastic material is electrically insulating.

14. The electrical machine according to claim 8, wherein:
at least one of the first, second, or third plastic materials have different heat conductivities.

15. The electrical machine according claim 8, wherein at least two of the first, second, or third plastic materials are made of different materials.

16. The method according to claim 1, further comprising:
injection molding or filling, respectively, the space with the plastic such that the air gap is no longer present in the space after the injection molding or the filling, respectively.

17. The method according to claim 1, wherein the space is embodied in a gap-free manner by the plastic.

18. The electrical machine comprising:
the stator produced by the method according to claim 17; and
a rotor configured to be rotatable about an axis of rotation relative to the stator.

19. The stator produced by the method according to claim 1.

20. A method for producing a stator for an electrical machine, the method comprising the steps of:
(a) providing the stator including a plurality of stator teeth arranged spaced apart from one another along a circumferential direction of a stator body and a ring-shaped stator body, from which the plurality of stator teeth for accommodating stator windings protrude, wherein a space is in each case embodied between two stator teeth adjacent to one another in the circumferential direction;
(b) first injection molding of at least two stator teeth adjacent to one another in the circumferential direction with a plastic;
(c) arranging at least one stator winding in the space; and
(d) second injection molding of the at least one stator winding arranged in the space with the plastic, such that an air gap and/or air trap formed between the stator teeth injection molded in step (b) and the at least one stator winding after arranging the at least one stator winding in the space according to step (c), is filled with the plastic,
wherein:
the plastic injected onto surface sections of the stator teeth is made of an electrically insulating first plastic material,
the plastic embodying at least one phase insulation is made of a second plastic material, and
the plastic embodying a first protective coating and/or a second protective coating is made of the second plastic material or of a third plastic material.

* * * * *